United States Patent
Lee et al.

(10) Patent No.: US 11,945,915 B2
(45) Date of Patent: Apr. 2, 2024

(54) METHOD FOR SYNTHESIZING PRE-HYDROLYZED POLYSILICATE

(71) Applicant: LG CHEM, LTD., Seoul (KR)

(72) Inventors: Kyu Reon Lee, Daejeon (KR); Kyoung Shil Oh, Daejeon (KR); Jong Hun Kim, Daejeon (KR); Se Won Baek, Daejeon (KR)

(73) Assignee: LG CHEM, LTD., Seoul (KR)

( * ) Notice: Subject to any disclaimer, the term of this patent is extended or adjusted under 35 U.S.C. 154(b) by 603 days.

(21) Appl. No.: 17/057,292

(22) PCT Filed: Nov. 27, 2019

(86) PCT No.: PCT/KR2019/016448
§ 371 (c)(1),
(2) Date: Nov. 20, 2020

(87) PCT Pub. No.: WO2020/111765
PCT Pub. Date: Jun. 4, 2020

(65) Prior Publication Data
US 2021/0206923 A1    Jul. 8, 2021

(30) Foreign Application Priority Data
Nov. 27, 2018  (KR) .................. 10-2018-0147975

(51) Int. Cl.
*C08G 77/02* (2006.01)
*C01B 33/143* (2006.01)
(Continued)

(52) U.S. Cl.
CPC ............ *C08G 77/02* (2013.01); *C01B 33/143* (2013.01); *C01B 33/1585* (2013.01); *C08J 3/075* (2013.01); *C08J 9/28* (2013.01)

(58) Field of Classification Search
CPC ..... C08G 77/02; C01B 33/143; C01B 33/163; C08J 3/075
See application file for complete search history.

(56) References Cited

U.S. PATENT DOCUMENTS

| 4,547,557 A | 10/1985 | McDaniel |
| 2009/0306326 A1 | 12/2009 | Magee et al. |

(Continued)

FOREIGN PATENT DOCUMENTS

| CN | 103180368 A | 6/2013 |
| CN | 108136749 A | 6/2018 |

(Continued)

OTHER PUBLICATIONS

Machine translation of KR20180040373A (Year: 2023).*
(Continued)

*Primary Examiner* — Colin W. Slifka
*Assistant Examiner* — Logan Edward Laclair
(74) *Attorney, Agent, or Firm* — BRYAN CAVE LEIGHTON PAISNER LLP

(57) ABSTRACT

A method for synthesizing a pre-hydrolyzed polysilicate, wherein a polysilicate is applied as a reactant when synthesizing the pre-hydrolyzed polysilicate, and the total amount of water added in the reaction system is specified. The method is capable of omitting a condensation reaction by applying a polysilicate as a reactant, thereby significantly shortening synthesis time and reducing production costs when compared with a typical synthesis method in which alkoxysilane-based monomer compound is used as a reactant. In addition, the gelation reaction time and the weight average molecular weight can be easily controlled, and a pre-hydrolyzed polysilicate excellent in storage stability and processability can be synthesized.

12 Claims, 1 Drawing Sheet

(51) Int. Cl.
*C01B 33/158* (2006.01)
*C08J 3/075* (2006.01)
*C08J 9/28* (2006.01)

(56) References Cited

U.S. PATENT DOCUMENTS

| | | | |
|---|---|---|---|
| 2010/0116743 A1* | 5/2010 | Pryor | B01J 20/28019 210/656 |
| 2011/0160429 A1 | 6/2011 | Magee et al. | |
| 2011/0184142 A1 | 7/2011 | Magee et al. | |
| 2012/0037838 A1 | 2/2012 | Bauer et al. | |
| 2012/0097907 A1 | 4/2012 | Bauer et al. | |
| 2016/0137841 A1 | 5/2016 | Warnshuis et al. | |
| 2017/0042934 A1 | 2/2017 | Bastos et al. | |
| 2018/0244029 A1 | 8/2018 | Kim et al. | |
| 2018/0312407 A1 | 11/2018 | Oh et al. | |
| 2019/0224233 A1 | 7/2019 | Bastos et al. | |
| 2019/0330423 A1 | 10/2019 | Lee et al. | |
| 2020/0010625 A1 | 1/2020 | Warnshuis et al. | |

FOREIGN PATENT DOCUMENTS

| | | |
|---|---|---|
| CN | 108290745 A | 7/2018 |
| EP | 2429948 | 3/2012 |
| JP | 2003-103712 | 4/2003 |
| JP | 2003-105261 | 4/2003 |
| JP | 2005-118635 | 5/2005 |
| JP | 4369200 | 11/2009 |
| JP | 4369200 B2 * | 11/2009 |
| JP | 2014-501320 | 1/2014 |
| JP | 5705334 | 4/2015 |
| JP | 6321814 | 5/2018 |
| KR | 10-0225990 | 10/1999 |
| KR | 10-2013-0102086 | 9/2013 |
| KR | 10-2016-0124797 | 10/2016 |
| KR | 20180040373 A * | 12/2016 |
| KR | 10-2017-0085556 | 7/2017 |
| KR | 10-2018-0040373 | 4/2018 |
| KR | 10-2018-0078015 | 7/2018 |
| KR | 10-1889474 | 8/2018 |
| KR | 10-1942474 | 1/2019 |
| WO | 1992-15650 | 9/1992 |
| WO | 2012-056290 | 5/2012 |
| WO | 2015-065557 | 5/2015 |

OTHER PUBLICATIONS

Machine translation of JP-4369200-B2 (Year: 2023).*
SpecialChem (Dynasylan® SILBOND® 40 Technical Data Sheet) (Year: 2010).*
Machine translation of JP-4369200-B2 (Year: 2009).*

* cited by examiner

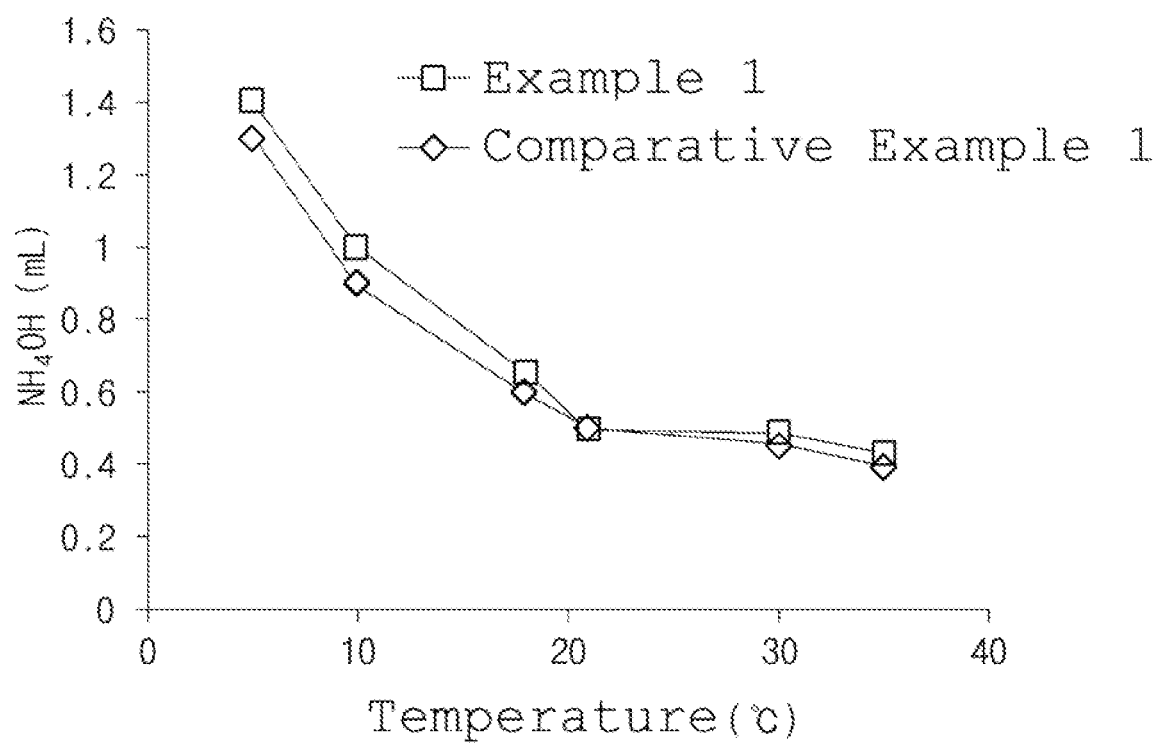

METHOD FOR SYNTHESIZING PRE-HYDROLYZED POLYSILICATE

CROSS-REFERENCE TO RELATED APPLICATIONS

This application is a National Stage Application of International Application No. PCT/KR2019/016448, filed Nov. 27, 2019, which claims the benefit of Korean Patent Application No. 10-2018-0147975, filed on Nov. 27, 2018, in the Korean Intellectual Property Office, the disclosures of which are incorporated herein in their entirety by reference.

TECHNICAL FIELD

The present invention relates to a method for synthesizing a pre-hydrolyzed polysilicate, the method applying polysilicate as a reactant.

BACKGROUND

An aerogel is a super-porous, high specific surface area ($\geq 500$ m$^2$/g) material having a porosity of about 90-99.9% and a pore size in the range of 1-100 nm, and is a material excellent in ultra-light weight, super thermal insulation, ultra-low dielectric, and the like. Accordingly, research on the development of aerogel materials as well as research on the practical use thereof as transparent insulation materials, environmentally friendly high temperature insulation materials, ultra-low dielectric thin films for highly integrated devices, catalysts and catalyst carriers, electrodes for super capacitors, and electrode materials for seawater desalination have been actively conducted.

The biggest advantages of the aerogel are that the aerogel has super-insulation properties exhibiting a thermal conductivity of 0.300 W/m·K or less, which is lower than that of a conventional organic insulation material such as Styrofoam, and that fire vulnerability and the generation of harmful gases in case of occurrence of fire which are fatal weaknesses of the organic insulation material can be solved.

In general, the aerogel is produced by preparing a hydrogel from a precursor material, and removing a liquid component inside the hydrogel without destroying a microstructure. An aerogel may be typically classified into three types, i.e., powder, granule, and monolith, and the silica aerogel is generally produced in the form of powder.

In particular, among the above silica precursors, tetra ethyl ortho silicate (TEOS) is a material which is used in a variety of industrial fields, such as in manufacturing for coating agents, insulation agents, and porous ceramic. In the market, various products such as pure TEOS, condensed TEOS, and pre-hydrolyzed TEOS (HTEOS) are sold.

Among the above, HTEOS is an ethyl polysilicate oligomer having a broad molecular weight distribution and is a partially hydrated ethyl polysilicate oligomer. When HTEOS is synthesized in the form of an oligomer from a TEOS monomer, physical properties such as gelation time may be adjusted, and thus, may be easily applied according to user's reaction conditions. In addition, there is an advantage in that reproducible physical properties of a final product may be created.

In general, the HTEOS is synthesized by performing a partial hydration reaction and a condensation reaction on an alkoxysilane-based monomer compound such as TEOS under acidic conditions. At this time, the condensation reaction is performed as a reflux reaction under acidic conditions, and since the rate of condensation is so slow, in order to achieve a desired degree of condensation, the condensation reaction must be performed for a long time. Accordingly, there are problems of high energy costs and the deterioration of process efficiency, and there is a problem in that the unit cost of raw materials of an alkoxysilane-based monomer compound such as TEOS which is used as a reactant is high, so that production costs are increased. Meanwhile, a condensation catalyst may be used to increase the condensation rate, but in this case, it is difficult to control the molecular weight of a reaction product, costs for purchasing a catalyst are generated, and a catalyst separation process should be added in a synthesis step, so that there are disadvantages in that processing becomes more complicated and production costs are increased.

Therefore, the inventors of the present invention have developed a novel method for synthesizing a pre-hydrolyzed polysilicate capable of omitting a condensation reaction when compared with a typical synthesis method by using a polysilicate other than an alkoxysilane-based monomer compound such as TEOS as a reactant, thereby simplifying a process and significantly reducing production costs.

PRIOR ART DOCUMENT

Patent Document (Patent Document 1) Japanese Patent Application Publication No. 2014-501320 (published on Jan. 20, 2014)

DISCLOSURE OF THE INVENTION

Technical Problem

An aspect of the present invention provides a novel method for synthesizing a pre-hydrolyzed polysilicate, the method capable of omitting a condensation reaction by applying a polysilicate as a reactant for synthesizing a pre-hydrolyzed polysilicate, thereby significantly shortening synthesis time and reducing production costs when compared with a typical synthesis method in which an alkoxysilane-based monomer compound is used as a reactant.

Another aspect of the present invention provides a novel method for synthesizing a pre-hydrolyzed polysilicate, the method capable of appropriately adjusting the amount of water and an acid catalyst to be introduced to a reaction to control the degree of hydration of polysilicate and ensuring excellent storage stability.

In addition, another aspect of the present invention provides a method for manufacturing a silica aerogel and a silica aerogel blanket by using a pre-hydrolyzed polysilicate synthesized by the above method as a silica precursor.

Technical Solution

According to an aspect of the present invention, there is provided a method for synthesizing a pre-hydrolyzed polysilicate, the method including (Step 1) introducing a polysilicate and an alcohol into a reactor, (Step 2) further introducing an acidic aqueous solution into the reactor to prepare a reaction mixture, and (Step 3) stirring the reaction mixture to perform a hydration reaction, wherein the reaction mixture includes water in an amount of 3 parts by weight to 42 parts by weight based on 100 parts by weight of the polysilicate.

According to another aspect of the present invention, there is provided a method for manufacturing a silica aerogel, the method including (Step 1) introducing a polysilicate and an alcohol into a reactor, (Step 2) further introducing an acidic aqueous solution into the reactor to prepare a reaction mixture, (Step 3) stirring the reaction mixture to form a pre-hydrolyzed polysilicate, (Step 4) adding water and an alcohol to the pre-hydrolyzed polysilicate, following by mixing to prepare a silica sol, (Step 5) mixing a basic catalyst to the silica sol, followed by performing gelation to form a silica wet gel, (Step 6) performing surface modification by mixing the silica wet gel with a surface modifier, and (Step 7) drying the surface-modified silica wet gel, wherein the reaction mixture includes water in an amount of 3 parts by weight to 42 parts by weight based on 100 parts by weight of the polysilicate and the gelation is performed under the condition in which the pH is 3 to 10.

According to yet another aspect of the present invention, there is provided a method for manufacturing a silica aerogel blanket, the method including preparing a silica sol by mixing a silica precursor, water, and an alcohol, mixing the silica sol with a basic catalyst and impregnating the mixture on a substrate for blanket, and performing gelation the silica sol impregnated on the substrate for blanket, wherein the silica precursor is a pre-hydrolyzed polysilicate synthesized according to the above described synthesis method and the gelation is performed under the condition in which the pH is 3 to 10.

Advantageous Effects

A method for synthesizing a pre-hydrolyzed polysilicate according to the present invention is capable of omitting a condensation reaction by applying a polysilicate as a reactant, thereby significantly shorten synthesis time and reducing production costs when compared with a typical synthesis method in which an alkoxysilane-based monomer compound is used as a reactant. In addition, according to the synthesis method of the present invention, the gelation reaction time and the weight average molecular weight may be easily controlled and a pre-hydrolyzed polysilicate excellent in storage stability and processability may be synthesized.

BRIEF DESCRIPTION OF THE DRAWINGS

The following drawings attached herein illustrate preferred embodiments of the present invention by example, and serve to enable technical concepts of the present invention to be further understood together with detailed description of the invention given below, and therefore the present invention should not be interpreted only with matters in such drawings.

FIG. 1 is a graph showing the usage of a basic catalyst according to a temperature during gelation in Example 1 and Comparative Example 1 of the present invention.

DETAILED DESCRIPTION

Hereinafter, the present invention will be described in more detail to facilitate understanding of the present invention. At this time, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A method for synthesizing a pre-hydrolyzed polysilicate according to an embodiment of the present invention includes (Step 1) introducing a polysilicate and an alcohol into a reactor, (Step 2) further introducing an acidic aqueous solution into the reactor to prepare a reaction mixture, and (Step 3) stirring the reaction mixture to perform a hydration reaction, wherein the reaction mixture includes water in an amount of 3 parts by weight to 42 parts by weight based on 100 parts by weight of the polysilicate.

In general, when a monomer compound such as a pre-hydrolyzed TEOS is used as a silica precursor used in the manufacturing of a silica aerogel or a silica aerogel blanket, it is difficult to control the weight average molecular weight or the gelation reaction time of a final product and stability is deteriorated. Therefore, a pre-hydrolyzed polysilicate oligomer having a weight average molecular weight of about 1,000 g/mol is prepared and used. This is because, unlike a monomer compound such as TEOS, when a material in an oligomer form is used, stability may be ensured even if the degree of hydration is increased for controlling gelation reaction time. However, in a typical process for synthesizing the pre-hydrolyzed polysilicate, an alkoxysilane-based monomer compound such as TEOS monomer is used as a reactant, and thus, a condensation reaction must be performed after partial hydration. At this time, the condensation reaction is performed as a reflux reaction under acidic conditions, and since the rate of condensation is so slow, in order to achieve a desired degree of condensation, the condensation reaction must be performed for a long time. Accordingly, there are problems of high energy costs and the deterioration of process efficiency, and there is a problem in that the unit cost of raw materials of an alkoxysilane-based monomer compound such as TEOS which is used as a reactant is high, so that production costs are increased. Meanwhile, a condensation catalyst may be used to increase the condensation rate, but in this case, it is difficult to control the molecular weight of a reaction product, costs for purchasing a catalyst are generated, and a catalyst separation process should be added in a synthesis step, so that there are problems in that processing becomes more complicated and production costs are increased.

Therefore, in a process for synthesizing a pre-hydrolyzed polysilicate, the present invention solves the above problems by introducing a novel synthesis method in which only a step of partial hydration is included by using polysilicate, not an alkoxysilane-based monomer compound such as TEOS as a reactant, a condensation reaction is omitted to increase synthesis processing efficiency, and an economic effect may be obtained in terms of manufacturing cost due to relatively low raw material cost. Furthermore, the present invention provides a novel method for synthesizing a pre-hydrolyzed polysilicate, the method capable of easily controlling gelation reaction time and a weight average molecular weight through the control of the content of an acid catalyst and the pH of the acid catalyst and synthesizing a pre-hydrolyzed polysilicate having excellent storage stability.

Hereinafter, each step of the method for synthesizing a pre-hydrolyzed polysilicate according to an embodiment of the present invention will be described in detail.

Step 1

Step 1) according to an embodiment of the present invention is a step of introducing polysilicate which is a reactant and alcohol to a reactor, and is characterized in that a condensation reaction in a synthesis process may be omitted and polysilicate may be added as a reactant having a higher production yield of silica per unit content than an alkoxysilane-based monomer compound.

The polysilicate according to an embodiment of the present invention may have a silica ($SiO_2$) production yield of 30 wt % or higher, and specifically, may have a silica production yield of 30-45 wt %. Here, the silica ($SiO_2$) production yield is a value represented as a ratio of the content of silica which may be produced from 100 wt % of polysilicate. A material having a high silica production yield has a large amount of silica which may be produced at the same content, and when the silica production yield is high, a relatively small amount of raw materials may be used to obtain a silica precursor containing a desired content degree of silica, so that there is an effect of reducing the cost of raw materials.

A polysilicate which may be used in the present invention is not limited as long as it is polysilicate capable of forming a pre-hydrolyzed polysilicate which may be used as a silica precursor of a silica aerogel or an aerogel blanket through a partial hydration reaction. Specifically, alkyl polysilicate may be used, and more specifically, one or more selected from the group consisting of methyl polysilicate, ethyl polysilicate, propyl polysilicate, isopropyl polysilicate, n-butyl polysilicate, secondary butyl polysilicate, tertiary butyl polysilicate, hexyl polysilicate, cyclohexyl polysilicate, and dodecyl polysilicate may be included.

Also, according to an embodiment of the present invention, the polysilicate may have an average degree of polymerization of 3 to 30, specifically 5 to 15, more specifically 6 to 12. Specifically, the polysilicate may be an oligomer having the above degrees of polymerization. When polysilicate satisfies the above average degree of polymerization, storage stability and fluidity are ensured so that ease of use is excellent. At this time, the average degree of polymerization was measured using Gel Permeation Chromatography (GPC) (Waters 2489 UV-vis Detector).

According to an embodiment of the present invention, the introduction amount of alcohol in Step 1) may be changed, and the alcohol may be introduced in an amount such that the content of silica ($SiO_2$) to be included in a finally produced pre-hydrolyzed polysilicate is 10 wt % to 30 wt %. When the content of silica is within the above range, the content of a silica aerogel in a blanket to be finally manufactured is sufficient, so that the desired level of thermal insulation effect may be achieved, and also, the mechanical properties of the blanket, especially an excellent level of flexibility may be obtained. Here, the amount of alcohol which allows the silica content to be 10 wt % to 30 wt % is specifically 20-280 parts by weight based on 100 parts by weight of polysilicate, specifically 50-120 parts by weight in terms of allowing the degree of hydration of a pre-hydrolyzed polysilicate to be synthesized to have an optimal range, more specifically, 80-110 parts by weight.

The kind of the alcohol is not limited as long as it is alcohol known to be used when preparing a pre-hydrolyzed polysilicate. Specifically, the alcohol may be an alcohol having 1-20 carbon atoms, more specifically, an alcohol having 1-5 carbon atoms. Among the above, the alcohol may be a monohydric alcohol having 1 to 5 carbon atoms.

Step 2)

Step 2) according to an embodiment of the present invention is a step of preparing a reaction mixture for partial hydration, and is a step in which the reaction mixture is prepared by introducing an acidic aqueous solution to a reactor including the reactant and stirring.

In addition, the reaction mixture prepared in Step 2) includes 3 parts by weight to 42 parts by weight of water based on 100 parts by weight of polysilicate.

Here, the acidic aqueous solution is a mixed solution including an acid catalyst and water, and may hydrate polysilicate using water included in the acidic aqueous solution and control the amount of water and acid catalyst and the pH of the acidic aqueous solution to control the degree of hydration of the polysilicate. As the degree of hydration of the polysilicate is controlled, the gelation time and pH of a finally produced pre-hydrolyzed polysilicate may be controlled.

The acidic aqueous solution may include an acid catalyst in an amount of 0.005 parts by weight to 0.073 parts by weight based on 100 parts by weight of polysilicate which is a reactant, and specifically, may include 0.010-0.050 parts by weight, more specifically, 0.015-0.030 parts by weight.

In the present invention, the content of acid catalyst included in an acidic aqueous solution is the same as the content of acid catalyst in the entire reaction mixture, and as the above content of acid catalyst is satisfied, the hydration rate during a hydration reaction to be described later may be improved to further improve the efficiency of the hydration reaction, and accordingly, the gelation reactivity of a synthesized pre-hydrolyzed polysilicate may also be improved. Also, the condensation reaction of the pre-hydrolyzed polysilicate itself may be suppressed to secure excellent storage stability, and a problem of corrosion due to excess acid catalyst may be prevented.

The acid catalyst according to an embodiment of the present invention is not particularly limited. However, the acid catalyst may be one or more selected from the group consisting of hydrochloric acid, nitric acid, acetic acid, sulfuric acid, and hydrofluoric acid, and may preferably be hydrochloric acid.

In addition, the acidic aqueous solution according to another aspect of the present may be an acidic aqueous solution having a pH of 0.5 to 2.5, or having a pH of 1.0 to 2.5 in terms of synthesizing a pre-hydrolyzed ethyl polysilicate having an optimal degree of hydration and gelation reactivity. When the above pH range is satisfied, it is possible to produce a pre-hydrolyzed polysilicate having an optimal pH and gelation time.

Also, the reaction mixture prepared in Step 2) may include water in an amount of 3 parts by weight to 42 parts by weight based on 100 parts by weight of the polysilicate, and specifically, may include 3 parts by weight to 30 parts by weight, more specifically, 6 parts by weight to 12 parts by weight. When the water is included in an amount less than 3 parts by weight, the water is included in too small an amount compared to the amount of polysilicate, so that a desired degree of hydration cannot be achieved during a hydration reaction, and when a pre-hydrolyzed polysilicate having a low degree of hydration is applied as a silica precursor in an aerogel manufacturing process, the ratio of a hydroxyl group (—OH) for inducing gelation is low, so that there may be a problem in that a gelation reaction is not smoothly performed. Also, when the water is included in an amount exceeding 42 parts by weight, the degree of hydration of a finally produced pre-hydrolyzed polysilicate becomes too high, so that most of an alkoxy functional group of a silica precursor is substituted with a hydroxyl group. Therefore, a gelation reaction may be performed in a process of storing and keeping, and since viscosity is easily increased, there may be a problem of deteriorating storage stability and processability.

In addition, in step 2), the content of the water and acid catalyst in the reaction mixture and the pH of the acidic aqueous solution may be controlled to control the degree of hydration, so that a unwanted gelation reaction may be prevented from occurring in the process of storing and keeping to secure excellent storage stability, and since the gelation time of a pre-hydrolyzed polysilicate may be controlled according to the above variable, desired gelation time may be obtained when a gelation reaction is induced.

Step 3)

Step 3) according to an embodiment of the present invention is a step for performing a hydration reaction by stirring the prepared reaction mixture, and is a step for forming a pre-hydrolyzed polysilicate in a partially hydrated state. Specifically, in Step 3) of the present invention, a hydration reaction may be performed by stirring a reaction mixture.

Step 3) according to an embodiment of the present invention may perform a partial hydration reaction by performing stirring for 30 minutes to 2 hours at room temperature, specifically under the condition of 15-25° C. Also, in the present invention, a polysilicate is used as a reactant, so that only by performing the above hydration reaction of Step 3), it is possible to synthesize a pre-hydrolyzed polysilicate, and since there is no need to perform a condensation reaction, which is essentially necessary when synthesizing a pre-hydrolyzed polysilicate by using a typical alkoxysilane-based monomer compound as a reactant, there are effects in that a synthesis process becomes simple and relatively low energy costs are required.

In the synthesis method of the present invention, when the reaction mixture includes water in an amount of 3-42 parts by weight and the acid catalyst in an amount of 0.005 parts by weight to 0.073 parts by weight, a pre-hydrolyzed polysilicate having a weight average molecular weight of 800 g/mol to 1,600 g/mol, more specifically 900 g/mol to 1,400 g/mol and an average degree of polymerization of 3 to 30, preferably 5 to 10, more preferably 6 to 12 may be synthesized as desired by the present invention. In addition, the pre-hydrolyzed polysilicate may be synthesized as a pre-hydrolyzed polysilicate oligomer having the above degree of polymerization.

In addition, the present invention provides a pre-hydrolyzed polysilicate synthesized by the above synthesis method, thereby having excellent in viscosity properties, storage stability, and processibility. In addition, the pre-hydrolyzed polysilicate may specifically be a pre-hydrolyzed alkyl polysilicate, and more preferably, may be a pre-hydrolyzed ethyl polysilicate (HTEOS) which has the most excellent utilization as a silica precursor when manufacturing a silica aerogel or a silica aerogel blanket.

In the present invention, a pre-hydrolyzed polysilicate may mean a polysilicate which has been partially hydrated, and specifically, may mean a polysilicate in the state in which some alkoxy functional groups of the polysilicate are substituted with hydroxyl groups.

Method for Manufacturing Silica Aerogel and Silica Aerogel Blanket

The present invention also provides a method for manufacturing a silica aerogel and/or a silica aerogel blanket, the method in which the pre-hydrolyzed polysilicate synthesized by the above synthesis method is used as a silica precursor.

Specifically, the method for manufacturing a silica aerogel according to an embodiment of the present invention includes (Step 1) introducing a polysilicate and an alcohol into a reactor, (Step 2) further introducing an acidic aqueous solution into the reactor to prepare a reaction mixture, (Step 3) stirring the reaction mixture to form a pre-hydrolyzed polysilicate, (Step 4) adding water and an alcohol to the pre-hydrolyzed polysilicate, following by mixing to prepare a silica sol, (Step 5) mixing a basic catalyst to the silica sol, followed by performing gelation to form a silica wet gel, (Step 6) performing surface modification by mixing the silica wet gel with a surface modifier, and (Step 7) drying the surface-modified silica wet gel, wherein the reaction mixture may include water in an amount of 3 parts by weight to 42 parts by weight based on 100 parts by weight of the polysilicate and the gelation may be performed under the condition in which the pH is 3 to 10.

Steps 1) to Step 3) according to an embodiment of the present invention are the same as described above.

The alcohol of Step 4) according to an embodiment of the present invention may be the same as described above in the synthesis method. Specifically, the kind of the alcohol is not limited as long as it is an alcohol known to be used when manufacturing an aerogel. Specifically, the alcohol may be an alcohol having 1-20 carbon atoms, more specifically an alcohol having 1-5 carbon atoms in terms of improving miscibility water and the aerogel. Among the above, the alcohol may be a monohydric alcohol having 1-5 carbon atoms.

In step 5) according to an embodiment of the present invention, the basic catalyst serves to promote the gelation in Step 5) by increasing the pH of the silica sol.

The basic catalyst which may be used in the silica sol according to an embodiment of the present invention may be an inorganic base such as sodium hydroxide and potassium hydroxide, or an organic base such as ammonium hydroxide. Specifically, the basic catalyst may be one or more selected from the group consisting of sodium hydroxide (NaOH), potassium hydroxide (KOH), calcium hydroxide (Ca(OH)$_2$), ammonia (NH$_3$), ammonium hydroxide (NH$_4$OH), tetramethylammonium hydroxide (TMAH), tetraethylammonium hydroxide (TEAH), tetrapropyl-ammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethyl amino) ethanol, 2-(methyl amino) ethanol, N-methyl diethanolamine, dimethylaminoethanol, diethylaminoethanol, nitrilotriethanol, 2-(2-aminoethoxy) ethanol, 1-amino-2-propanol, triethanolamine, monopropanolamine, dibutanolamine, and pyridine, preferably sodium hydroxide, ammonia, ammonium hydroxide or mixtures thereof.

The basic catalyst may be included in an amount such that the pH of the silica sol becomes 3 to 10. When the basic catalyst is added such that the pH of the silica sol satisfies the above range, an optimal gelation rate may be obtained. In addition, since the basic catalyst may be precipitated when introduced in a solid phase, it may be preferable that the basic catalyst is added in the form of a solution diluted with the alcohol described above. At this time, the dilution ratio of the basic catalyst and alcohol may be 1:4 to 1:100 based on volume.

The gelation performed in Step 5) of the present invention may form a network structure from a silica precursor material, wherein the network structure represents a planar mesh structure in which specific polygons having one or more types of atomic arrangement are linked to each other, or a structure in which specific polyhedrons share their vertices, edges, faces, and the like with each other to form a three-dimensional skeleton structure.

The gelation according to an embodiment of the present invention may be performed under the condition in which the pH is 3 to 10, preferably the pH is 4 to 8 in terms of ensuring an optimal gelation rate.

In addition, according to an embodiment of the present invention, Step 5) may include mixing a basic catalyst with the silica sol and then impregnating the mixture on a substrate for blanket and performing gelation on the silica sol impregnated on the substrate for blanket to manufacture a silica aerogel blanket.

The substrate for blanket according to an embodiment of the present invention may specifically be a porous substrate in terms of improving the thermal insulation properties of a silica aerogel blanket. When a porous substrate for blanket is used, a silica sol is allowed to easily penetrate into the substrate, and thus, forms an aerogel uniformly inside the substrate for blanket, so that a silica aerogel blanket manufactured may have excellent thermal insulation properties.

The substrate for blanket which may be used according to an embodiment of the present invention may be a film, a sheet, a net, a fiber, a foam, a non-woven body, or a laminate of two or more layers thereof. Also, according to the use, surface roughness may be formed or patterned on the surface thereof. More specifically, the substrate for blanket may be a fiber capable of further improving thermal insulation performance by including a space or a void through which a silica aerogel may be easily inserted into the substrate for blanket. Furthermore, the substrate for blanket may preferably have low thermal conductivity.

Specifically, the substrate for blanket may be polyamide, polybenzimidazole, polyaramid, an acryl resin, a phenol resin, polyester, polyetheretherketone (PEEK), polyolefin (for example, polyethylene, polypropylene, a copolymer thereof, or the like), cellulose, carbon, cotton, wool, hemp, a non-woven fabric, a glass fiber, ceramic wool, or the like. More specifically, the substrate for blanket in the present invention may be a glass fiber.

Also, in the present invention, impregnating the silica sol on a substrate for blanket may be performed in a reaction vessel capable of accommodating the substrate for blanket, and the impregnation may be performed either by pouring a silica sol into the reaction vessel in which the substrate for blanket is accommodated, or by placing a substrate for blanket in a reaction vessel containing a silica sol to be soaked. At this time, in order to improve the bonding of the substrate for blanket and the silica sol, the substrate for blanket may be lightly pressed down to be sufficiently impregnated. Also, thereafter, the substrate for blanket may be pressed at a constant pressure to a predetermined thickness to remove excess silica sol, thereby shortening drying time.

In addition, a step of performing gelation on a silica sol in the process for manufacturing a blanket may be performed under the same conditions and in the same manner as the gelation of Step 5) described above.

Additionally, the method for manufacturing a silica aerogel and/or a silica aerogel blanket according to an embodiment of the present invention may further perform an aging step as a process for allowing a chemical change to be completely achieved by leaving the silica wet gel and/or a silica wet gel blanket to stand at a suitable temperature. The aging step may more firmly form the formed network structure, and thus, may enhance the mechanical stability of the aerogel of the present invention.

The aging step of the present invention is performed by adding a solution in which a basic catalyst such as sodium hydroxide (NaOH), potassium hydroxide (KOH), ammonium hydroxide (NH 4 OH), triethylamine, pyridine, and the like is diluted in an organic solvent at a concentration of 1-10%. Therefore, a Si—O—Si bonding in an aerogel is induced to the maximum to allow the network structure of a silica gel to be more firm, so that there is an effect of facilitating the maintenance of the pore structure in a quick drying process to be performed later. At this time, the organic solvent may be the alcohol described above, and specifically, may include ethanol.

Also, the aging step should be performed in a suitable temperature range to enhance the optimal pore structure. The aging step of the present invention may be performed by leaving the wet gel blanket to stand for 1-10 hours at a temperature of 30-70° C. When the aging temperature satisfies the above range, aging efficiency may be further improved to increase productivity. Also, when ethanol is used as an organic solvent, the above temperature range is a temperature range below the boiling point of the ethanol, so that it is possible to prevent the solvent loss due to evaporation.

In addition, according to an embodiment of the present invention, a surface modification step (Step 6) may be further performed in order to manufacture a hydrophobic silica aerogel and/or aerogel blanket, and the surface modification may be achieved by mixing a surface modifier with the silica wet gel manufactured in Step 5.

The dried silica aerogel maintains a low thermal conductivity rate just after drying, however, absorbs water in the air due to a hydrophilic silanol group (Si—OH) present on the surface of silica, so that there is a disadvantage in that the thermal conductivity is gradually increased. Therefore, in order to maintain low thermal conductivity, there is a need to modify the surface of the silica aerogel to be hydrophobic.

Accordingly, the surface modification according to an embodiment of the present invention may be performed by a surface modifier including a polar solvent and an organosilane compound.

As the polar solvent, methanol, ethanol isopropyl alcohol, or the like may be used, and as the organosilane compound, trimethylchlorosilane (TMCS), hexamethyldisilazane (HMDS), methyltrimethoxysilane, trimethylethoxysilane, ethyltriethoxysilane, phenyltriethoxysilane, or the like may be used. Specifically, hexamethyldisilazane may be used.

In the surface modification, it is preferable that the solvent is preferably mixed at a volume ratio of 1 to 10 with respect to the gel, and the organosilane compound is mixed at a volume ratio of 0.1 to 10 with respect to the gel. When the volume ratio of the organosilane compound satisfies the above range, optimal reaction time may be obtained, and the surface modification is performed using an appropriate amount of a surface modifier, so that the problem of cost rise is solved and the phenomenon in that the gel structure is contracted during drying by the residual unreacted surface modifier is prevented.

In addition, the surface-modified silica wet gel and/or wet gel blanket according to an embodiment of the present invention may be subjected to a drying step (Step 7) to be manufactured as a hydrophobic silica aerogel and/or aerogel blanket. The surface-modified silica wet gel and/or wet gel blanket according to an embodiment of the present invention may be a hydrophobic silica wet gel and/or wet gel blanket.

Meanwhile, the manufacturing method according to an embodiment of the present invention may further perform a washing step before the drying. The washing is a step for removing impurities (sodium ions, unreacted substances, by-products, and the like) generated during the reaction and residual ammonia, which may generate an ammonium carbonate salt by reacting with $CO_2$ during supercritical drying, and the like in order to obtain a hydrophobic silica aerogel with high purity, and may be performed by a dilution process or an exchange process using a non-polar organic solvent.

The drying step according to an embodiment of the present invention may be performed through a process for removing a solvent while maintaining the pore structure of an aged gel, and the drying step may be performed by a supercritical drying process or an ambient drying process.

The supercritical drying process may be performed using supercritical carbon dioxide. Carbon dioxide ($CO_2$) is in a gaseous state at room temperature and atmospheric pressure. However, when a temperature and pressure exceed a predetermined temperature and pressure limit called a supercritical point, the evaporation process does not occur so that carbon dioxide becomes to be in a critical state in which gas and liquid cannot be distinguished. Carbon dioxide in a critical state is referred to a supercritical carbon dioxide.

A supercritical carbon dioxide has a molecular density close to that of a liquid, however, has a low viscosity, thereby having properties close to those of gas. Therefore, a supercritical carbon dioxide has a high diffusion rate and a high thermal conductivity so that drying efficiency thereof is high, and drying process time may be shortened.

Specifically, the supercritical drying process includes a solvent substitution process in which an aged silica gel is placed into a supercritical drying reactor, $CO_2$ in a liquid state is filled therein, and an alcohol solvent inside a silica aerogel is substituted with $CO_2$. Thereafter, the temperature is raised to 40-50° C. at a certain temperature raising rate, specifically, 0.1° c./min to 1° c./min, and the pressure which is greater than a pressure at which carbon dioxide becomes a supercritical state, specifically, pressure of 100 bar to 150 bar is maintained to allow the carbon dioxide to remain in a supercritical state for a certain amount of time, specifically for 20 minutes to 1 hour. In general, carbon dioxide becomes to be in a supercritical state at a temperature of 31° c. and pressure of 73.8 bar. After carbon dioxide is maintained at a predetermined temperature and a predetermined pressure to remain in a supercritical state for 2 hours to 12 hours, more specifically, 2 hours to 6 hours, the pressure is generally lowered to complete the supercritical drying process to manufacture an aerogel blanket.

Also, the ambient drying process may be performed according to a typical method such as natural drying under a temperature of 70-200° C. and atmospheric pressure (1±0.3 atm).

As a result of the above drying process, a blanket including a porous silica aerogel and/or a blanket including a porous silica aerogel having nano-sized pores may be manufactured. The silica aerogel has excellent physical properties together with high hydrophobicity, especially low tap density and high porosity, and a silica aerogel containing blanket including the same has excellent mechanical flexibility together with low thermal conductivity.

In addition, before or after the drying process, a compression process to control the thickness and make the internal structure and surface shape of a blanket uniform, a molding process to have a suitable shape or morphology according to use, or a lamination process for laminating a separate functional layer may be further performed.

Hereinafter, Examples of the present invention will be described in detail so that those skilled in the art may easily carry out the present invention. However, the present invention may be embodied in many different forms, and is not limited to Examples set forth herein.

Example 1

25.0 g of ethyl polysilicate and 23.8 g of ethanol were introduced into a reactor and stirred. Thereafter, 2.3 g (HCl: 0.004 g) of a HCl aqueous solution having a pH of 1.8 was introduced into the reactor to prepare a reaction mixture. At this time, a total of 2.296 g of water was contained in the prepared reaction mixture. Stirring was performed for one hour at room temperature (20±5° C.) to partially hydrate the ethyl polysilicate and a pre-hydrolyzed ethyl polysilicate (HTEOS) oligomer, which is a final product, was collected.

Example 2

A pre-hydrolyzed ethyl polysilicate (HTEOS) oligomer was synthesized in the same manner as in Example 1 except that 2.3 g (HCl: 0.005 g) of a HCl aqueous solution having a pH of 1.6 was introduced and the content of water in the prepared reaction mixture was adjusted to numerical values listed in Table 1 below.

Example 3

A pre-hydrolyzed ethyl polysilicate (HTEOS) oligomer was synthesized in the same manner as in Example 1 except that 23.9 g of ethanol was introduced, 2.2 g (HCl: 0.006 g) of a HCl aqueous solution having a pH of 1.5 was introduced, and the content of water in the prepared reaction mixture was adjusted to numerical values listed in Table 1 below.

Example 4

A pre-hydrolyzed ethyl polysilicate (HTEOS) oligomer was synthesized in the same manner as in Example 1 except that 23.9 g of ethanol was introduced, 2.1 g (HCl: 0.008 g) of a HCl aqueous solution having a pH of 1.2 was introduced, and the content of water in the prepared reaction mixture was adjusted to numerical values listed in Table 1 below.

Example 5

A pre-hydrolyzed ethyl polysilicate (HTEOS) oligomer was synthesized in the same manner as in Example 1 except that 22.0 g of ethanol was introduced, 2.1 g (HCl: 0.010 g) of a HCl aqueous solution having a pH of 1.0 was introduced, and the content of water in the prepared reaction mixture was adjusted to numerical values listed in Table 1 below.

Example 6

A pre-hydrolyzed ethyl polysilicate (HTEOS) oligomer was synthesized in the same manner as in Example 1 except that 25.0 g of ethanol was introduced, 1.0 g (HCl: 0.002 g) of a HCl aqueous solution having a pH of 1.8 was introduced, and the content of water in the prepared reaction mixture was adjusted to numerical values listed in Table 1 below.

Example 7

A pre-hydrolyzed ethyl polysilicate (HTEOS) oligomer was synthesized in the same manner as in Example 6 except that 23.0 g of ethanol was introduced, 3.0 g (HCl: 0.005 g) of a HCl aqueous solution having a pH of 1.8 was introduced, and the content of water in the prepared reaction mixture was adjusted to numerical values listed in Table 1 below.

Example 8

A pre-hydrolyzed ethyl polysilicate (HTEOS) oligomer was synthesized in the same manner as in Example 6 except that 21.0 g of ethanol was introduced, 5.0 g (HCl: 0.009 g) of a HCl aqueous solution having a pH of 1.8 was introduced, and the content of water in the prepared reaction mixture was adjusted to numerical values listed in Table 1 below.

Example 9

A pre-hydrolyzed ethyl polysilicate (HTEOS) oligomer was synthesized in the same manner as in Example 6 except that 19.0 g of ethanol was introduced, 7.0 g (HCl: 0.012 g) of a HCl aqueous solution having a pH of 1.8 was introduced, and the content of water in the prepared reaction mixture was adjusted to numerical values listed in Table 1 below.

Example 10

A pre-hydrolyzed ethyl polysilicate (HTEOS) oligomer was synthesized in the same manner as in Example 6 except that 17.0 g of ethanol was introduced, 9.0 g (HCl: 0.016 g) of a HCl aqueous solution having a pH of 1.8 was introduced, and the content of water in the prepared reaction mixture was adjusted to numerical values listed in Table 1 below.

Comparative Example 1

25.0 g of TEOS and 7.15 g of ethanol were introduced into a reactor and stirred. Thereafter, 3.675 g (HCl: 0.006 g) of a HCl aqueous solution having a pH of 1.8 was introduced into the reactor, followed by stirring at room temperature (20±5° C.) for one hour to partially hydrate the TEOS. Thereafter, heating was performed for 24 hours at 85° C. to perform a condensation reaction, and the temperature was lowered to room temperature to collect a finally produced pre-hydrolyzed ethyl polysilicate (HTEOS) oligomer.

Comparative Example 2

The same method was performed except that a condensation reaction was not performed in Comparative 1, and since the condensation reaction was not performed, a pre-hydrolyzed ethyl polysilicate was not synthesized, and a hydrated TEOS monomer was collected.

Comparative Example 3

A pre-hydrolyzed ethyl polysilicate (HTEOS) oligomer was synthesized in the same manner as in Example 1 except that 0.5 g (HCl: 0.001 g) of a HCl aqueous solution having a pH of 1.8 was introduced and the content of water in the prepared reaction mixture was adjusted to numerical values listed in Table 1 below.

Comparative Example 4

A pre-hydrolyzed ethyl polysilicate (HTEOS) oligomer was synthesized in the same manner as in Example 1 except that 12 g (HCl: 0.021 g) of a HCl aqueous solution having a pH of 1.8 was introduced and the content of water in the prepared reaction mixture was adjusted to numerical values listed in Table 1 below.

Experimental Example 1: Measurement of Weight Average Molecular Weight (Mw, g/Mol)

The weight average molecular weight of the pre-hydrolyzed ethyl polysilicate oligomer synthesized in each of Examples and Comparative Examples was measured, and the results are shown in Table 1. The weight average molecular weight was measured using Gel Permeation Chromatography (GPC) (Waters 2489 UV-vis Detector), and 40 ml of tetrahydrofuran (THF) was dissolved in 0.05 g of each pre-hydrolyzed ethyl polysilicate oligomer, followed by filtering with a 0.45 μm filter, and then placed in a GPC vial (4 mf) to prepare each sample. A solvent (THF) was injected at a rate of 1.0 mf/min starting from 1 hour before the measurement, and the measurement was performed under the conditions of 40 minutes of measurement time, 150 μl of injection volume, 1.0 mf/min of flow rate, and a temperature of 40° C. using a UV-vis Detector. At this time, calibration was performed using a PS standard.

Experimental Example 2: Measurement of Gelation Reaction Time

Using the pre-hydrolyzed ethyl polysilicate oligomer synthesized in each of Examples and Comparative Examples, the time taken for a gelation reaction was measured.

Specifically, to a mixed solution prepared by mixing each of the pre-hydrolyzed ethyl polysilicate, ethanol, and water in a weight ratio of 2.9:6.5:1 in a reaction vessel, an ammonium hydroxide (NH$_4$OH) catalyst diluted in ethanol was added in an amount of 10 vol % to perform a gelation reaction by having a pH of 4 to 9, and the time at which gelation was completed, that is, the time when all of the reactants were converted to a gel state was measured.

Experimental Example 3: Measurement of Storage Stability Measurement Index (%)

As shown in Equation 1 below, the weight average molecular weight (Mw) of each pre-hydrolyzed ethyl polysilicate oligomer synthesized in Examples and Comparative Examples or a hydrated TEOS monomer was measured by the method described with reference to Experimental Example 1 and the percentage of change in a value measured for the same sample after one month were calculated as a storage stability measurement index. The lower the value, the more stable it is, and when the rate of change based on the initially measured molecular weight is greater than 10%, it was determined that there was no stability and was represented as unmeasurable.

(storage stability measurement index)=(*Mw* of sample after one month)–(*Mw* of sample initially measured)/(*Mw* of sample initially measured)×100     Equation 1

Experimental Example 4: Measurement of Basic Catalyst Usage According to Temperature During Gelation Each pre-hydrolyzed ethyl polysilicate synthesized in Examples and Comparative Examples was used to measure the usage of ammonium hydroxide (NH$_4$OH) which may have a gelation time of 10 minutes according to temperature, and the results are shown graphically in FIG. 1.

TABLE 1

| Classification | | Reactant type | Water introduction amount (phm) | Acid catalyst introduction amount (phm) | Condensation reaction | pH of HTEOS | Weight average molecular weight (Mw, g/mol) | Gelation reaction time (min) | Storage stability measurement index (%) | Silica content of product (wt %) | HTEOS production amount (g) |
|---|---|---|---|---|---|---|---|---|---|---|---|
| Example | 1 | Ethyl polysilicate | 9.2 | 0.016 | X | 1.38 | 965 | 10 | 2.8 | 20 | 51.1 |
|  | 2 |  | 9.2 | 0.020 | X | 1.01 | 961 | 10 | 2.4 | 20 | 51.1 |
|  | 3 |  | 8.8 | 0.024 | X | 0.88 | 975 | 10 | 2.1 | 20 | 51.1 |
|  | 4 |  | 8.4 | 0.032 | X | 0.45 | 963 | 10 | 2.6 | 20 | 51 |
|  | 5 |  | 8.4 | 0.040 | X | 0.30 | 994 | 10 | 2.1 | 20 | 49.1 |
|  | 6 |  | 4.0 | 0.007 | X | 1.24 | 992 | 20 | 1.7 | 20 | 51 |
|  | 7 |  | 12.0 | 0.021 | X | 1.39 | 953 | 8 | 3 | 20 | 51 |
|  | 8 |  | 20.0 | 0.035 | X | 1.78 | 945 | 6 | 4.5 | 20 | 51 |
|  | 9 |  | 28.0 | 0.049 | X | 2.10 | 938 | 4 | 4.2 | 20 | 51 |
|  | 10 |  | 36.0 | 0.063 | X | 2.26 | 933 | 3 | 6.5 | 20 | 51 |
| Comparative Example | 1 | TEOS | 14.7 | 0.026 | O | 1.46 | 966 | 10 | 3.8 | 20 | 35.825 |
|  | 2 | TEOS | 14.7 | 0.026 | X | — (HTEOS not synthesized) | — | 10 (SiO₂ precipitated) | (SiO₂ precipitated) | 20 | — |
|  | 3 | Ethyl polysilicate | 2.0 | 0.003 | X | 1.12 | 981 | Many hours | 1.1 | 14.2 | 50.8 |
|  | 4 |  | 48.0 | 0.083 | X | 1.72 | 927 | 10 secs | — (Gelled) | 15.3 | 47 | phm: parts by weight based on 100 parts by weight of ethyl polysilicate

Water introduction amount: total amount of water introduced to reaction mixture

As shown in Table 1, in Examples 1 to 10 in which polysilicate was used as a reactant and the content of water (introduction amount) in a reaction system was specified, even when only a hydration reaction was performed at room temperature without performing a condensation under a separate high temperature condition, a pre-hydrolyzed polysilicate suitable as a precursor of a silica aerogel blanket was confirmed to be prepared.

In Comparative Example 1, HTEOS was prepared by hydrating and condensing a tetraethoxy silicate (TEOS) monomer, and the pH, weight average molecular weight, silica content, gelation time and storage stability of the prepared HTEOS were similar to those of Examples. However, since a condensation reaction which is performed for a long time under a high temperature condition is essentially required in the manufacturing process, manufacturing time is very long and separate manufacturing equipment is required, so that efficiency in the process is greatly reduced, and when preparing HTEOS having the same silica content with the same amount of reactant as in Example, the amount of HTEOS produced was confirmed to be significantly lower than that of Examples of the present invention.

Meanwhile, in Comparative Example 2, a condensation reaction was not performed as in Comparative Example 1 and in Examples of the present invention under the same conditions. When a TEOS monomer was used as a reactant and the condensation reaction was not performed, even when a hydration reaction was performed at room temperature by adding ethanol and an acidic aqueous solution, it was confirmed that HTEOS was not synthesized but a TEOS monomer in a hydrated state was produced. At this time, most functional groups were in a hydrated state. Since present as a hydrated monomer as described above, the measurement sample was very unstable, so that a reliable weight average molecular weight value could not be measured. The hydrated TEOS monomer is in an unstable state having high gelation reactivity unlike HTEOS of Examples, and thus, when stored in the state of a hydrated TEOS monomer, a silica formation reaction occurs among monomers, so that silica is precipitated as an insoluble salt, not allowing storage stability to be ensured. In addition, even when a basic catalyst is added to induce gelation, some silica components do not form a three-dimensional network structure and are confirmed to be precipitated as silica in an insoluble salt state. In addition, when a silica component is precipitated in the form of an insoluble salt as in Comparative Example 2, there is a problem in that the network structure of a silica gel is not firmly formed.

Also, in Comparative Example 3 in which the introduction amount of water in a reaction system was small, which was out of the range of the present invention, the degree of hydration of HTEOS did not reach a desired level, so that even when a basic catalyst was added to induce gelation, it was confirmed that a gelation reaction was not smoothly performed. In Comparative Example 4 in which the introduction amount of water was excessive, the degree of hydration of HTEOS was so high that gelation was achieved in a short time when a basic catalyst was added, and a gelation reaction was spontaneously performed during storage so that storage stability in a silica precursor state was confirmed to be not ensured. In addition, HTEOS produced in each of Comparative Examples 3 and 4 was confirmed to include a lower silica content than Examples.

In addition, among Examples, Examples 1 to 5 were confirmed to ensure an optimal gelation reactivity while having an excellent level of storage stability.

Meanwhile, referring to FIG. 1 in which the usage of ammonium hydroxide (basic catalyst) when having a gelation time of 10 minutes was measured for each temperature, HTEOS of Example 1 of the present invention was confirmed to have the same level of amount or a similar level of amount of ammonium hydroxide ($NH_4OH$) used for each temperature as HTEOS of Comparative Example 1 prepared by a typical method. From the above, it can be confirmed that Example 1 and Comparative Example 1 have a similar level of gelation reactivity.

Experimental Example 5: Measurement of Physical Properties of Aerogel Blanket HTEOS prepared in each of Examples and Comparative Examples was used as a silica precursor to manufacture a silica aerogel blanket, and the physical properties of the aerogel blanket were measured.

Specifically, HTEOS prepared in each of Examples and Comparative Examples, ethanol, and water were mixed in a weight ratio of 1:2.25:1 to prepare 155 ml of silica sol (silica content in silica sol is 4 wt %). After adding ammonium hydroxide (ammonia water) as a basic catalyst to the prepared silica sol, a glass fiber was impregnated and then gelation was performed to prepare a wet gel. At this time, as the ammonium hydroxide catalyst, an ammonium hydroxide dilution solution (volume ratio of ammonium hydroxide:ethanol is 1:12.65) diluted in ethanol, which is an organic solvent, was used. Thereafter, the prepared silica wet gel was impregnated in 5% ammonium hydroxide dilution solution (diluted solvent is ethanol) to be aged for one hour at about 50° C.

Thereafter, the aged wet gel blanket was added with 90 vol % of a surface modifier reaction solution (Hexamethyldisilazane (HMDS)) based on the volume of the silica wet gel at about 60° C. to perform surface modification for one hour. At this time, the surface modifier reaction solution is a surface modifier (HMDS) dilution solution diluted in ethanol, and the surface modifier is included in an amount of 5 vol % based on the 100 vol % of the entire reaction solution. After the completion of the surface modification reaction, the wet gel blanket was subjected to supercritical drying for 4 hours using $CO_2$ under the conditions of 60° C. and 150 bar in a 70 L supercritical extractor, followed by drying for 1 hour under the conditions of 150° C. and atmospheric pressure to manufacture a silica aerogel blanket.

1) Measurement of Thermal Conductivity

The room temperature thermal conductivity of the silica aerogel blanket manufactured in each of Examples and Comparative Examples was measured using the HFM 436 equipment of NETZSCH Co., Ltd, and the results are shown in Table. 2.

2) Carbon Content (Wt %)

The carbon content was measured using a carbon analyzer (Carbon-Sulfur Analyzer CS-2000, Eltra Co., Ltd.), and the results are shown in Table 2.

TABLE 2

| Classification | | Thermal conductivity (mW/mK) | Thickness (cm) | Carbon content (%) |
|---|---|---|---|---|
| Examples | 1 | 17.2 | 1.001 | 9.54 |
| | 2 | 18.3 | 1.054 | 9.46 |
| | 3 | 17.9 | 1.068 | 9.43 |
| | 4 | 18.4 | 1.015 | 9.31 |
| | 5 | 18.2 | 1.025 | 9.65 |
| | 6 | 18.2 | 1.054 | 9.18 |
| | 7 | 17.3 | 1.038 | 9.41 |
| | 8 | 19.1 | 1.075 | 9.22 |
| | 9 | 19.2 | 1.079 | 9.62 |
| | 10 | 18.5 | 1.022 | 9.57 |
| Comparative Examples | 1 | 17.6 | 1.035 | 9.77 |
| | 2 | 17.9 | 1.021 | 9.62 |
| | 3 | — | — | — |
| | 4 | — | — | — |

As shown in Table 2, when a silica aerogel blanket was manufactured using HTEOS synthesized in each of Examples according to the present invention, the silica aerogel blanket was confirmed to have an excellent level of thermal conductivity, thickness, and carbon content. In addition, Examples were confirmed to have the same or a similar level of thermal conductivity and carbon content as the silica aerogel blankets of Comparative Examples 1 to 2 to which a TEOS monomer compound, which is a typically used precursor, was applied. From the above, it can be seen that HTEOS synthesized according to the method of the present invention is a material suitable to be used as a silica precursor of a silica aerogel blanket exhibiting high thermal insulation and hydrophobicity.

Meanwhile, in Comparative Example 3, since the gelation reactivity of the prepared HTEOS was significantly decreased, a gel was not formed, so that a silica aerogel blanket was not manufactured. In Comparative Example 4, since the gelation reactivity of the prepared HTEOS was too high, a gel was started to form even before a silica sol was impregnated on a substrate for blanket, so that ultimately, a silica aerogel blanket was not manufactured.

The foregoing description of the present invention has been presented for purposes of illustration. It will be understood by those skilled in the art that various changes in form and details may be made therein without departing from the spirit and scope of the invention. It is therefore to be understood that the above-described embodiments are illustrative in all aspects and not restrictive.

The invention claimed is:

1. A method for synthesizing a pre-hydrolyzed polysilicate, the method comprising:
    (Step 1) introducing a polysilicate and an alcohol into a reactor and stirring the polysilicate and the alcohol together;
    (Step 2) after stirring the polysilicate and the alcohol together in the reactor, further introducing an acidic aqueous solution into the reactor with stirring to prepare a reaction mixture; and
    (Step 3) stirring the reaction mixture to perform a hydration reaction,
    wherein the reaction mixture includes water in an amount of 3 parts by weight to 42 parts by weight based on 100 parts by weight of the polysilicate.

2. The method of claim 1, wherein the acidic aqueous solution comprises an acid catalyst in an amount of 0.005-0.073 parts by weight based on 100 parts by weight of the polysilicate.

3. The method of claim 1, wherein the alcohol is introduced in an amount of 20-280 parts by weight based on 100 parts by weight of the polysilicate.

4. The method of claim 1, wherein the polysilicate has an average degree of polymerization of 3 to 30.

5. The method of claim 1, wherein Step 3) is performed for 30 minutes to 2 hours under the condition of 15-25° C.

6. The method of claim 1, not comprising a condensation reaction step.

7. The method of claim 1, wherein the polysilicate comprises one or more selected from the group consisting of methyl polysilicate, ethyl polysilicate, propyl polysilicate, isopropyl polysilicate, butyl polysilicate, secondary butyl polysilicate, tertiary butyl polysilicate, hexyl polysilicate, cyclohexyl polysilicate, and dodecyl polysilicate.

8. The method of claim 1, wherein the polysilicate has a silica ($SiO_2$) production yield of 30 wt % or higher.

9. The method of claim 1, wherein a weight average molecular weight (Mw) of the pre-hydrolyzed polysilicate is 800-1,600 g/mol.

10. The method of claim 1, wherein the reaction mixture includes water in an amount of 6 parts by weight to 12 parts by weight based on 100 parts by weight of the polysilicate.

11. The method of claim 1, wherein the polysilicate has an average degree of polymerization of 6 to 12.

12. The method of claim 1, wherein a weight average molecular weight (Mw) of the pre-hydrolyzed polysilicate is 900-1,400 g/mol.

* * * * *